United States Patent
Swanson et al.

(10) Patent No.: US 9,623,962 B2
(45) Date of Patent: Apr. 18, 2017

(54) ACTIVE VIBRATION CONTROL SYSTEMS AND METHODS FOR VEHICLES

(71) Applicants: LORD CORPORATION, Cary, NC (US); Doug A. Swanson, Cary, NC (US); David W. Edeal, Apex, NC (US); Douglas G. Pedersen, Apex, NC (US); David Clark, Apex, NC (US)

(72) Inventors: Doug A. Swanson, Cary, NC (US); David W. Edeal, Apex, NC (US); Douglas G. Pedersen, Apex, NC (US); David Clark, Apex, NC (US)

(73) Assignee: LORD Corporation, Cary, NC (US)

( * ) Notice: Subject to any disclaimer, the term of this patent is extended or adjusted under 35 U.S.C. 154(b) by 0 days.

(21) Appl. No.: 14/441,876

(22) PCT Filed: Nov. 12, 2013

(86) PCT No.: PCT/US2013/069524
§ 371 (c)(1),
(2) Date: May 11, 2015

(87) PCT Pub. No.: WO2014/075030
PCT Pub. Date: May 15, 2014

(65) Prior Publication Data
US 2015/0307186 A1    Oct. 29, 2015

Related U.S. Application Data

(60) Provisional application No. 61/725,043, filed on Nov. 12, 2012.

(51) Int. Cl.
| B64C 27/00 | (2006.01) |
| F16F 15/00 | (2006.01) |
| B60L 7/24 | (2006.01) |

(52) U.S. Cl.
CPC .......... *B64C 27/001* (2013.01); *F16F 15/002* (2013.01); *B64C 2027/004* (2013.01)

(58) Field of Classification Search
CPC ..... B60T 8/17; B60L 7/24; B60L 7/12; B64C 27/00; F16F 15/00
(Continued)

(56) References Cited

U.S. PATENT DOCUMENTS

| 4,892,328 A | 1/1990 | Kurtzman et al. | |
| 4,946,354 A * | 8/1990 | Aubry ..................... | B64C 27/54 416/157 A |

(Continued)

*Primary Examiner* — Tan Q Nguyen
(74) *Attorney, Agent, or Firm* — Richard G. Miller

(57) ABSTRACT

Active vibration control systems (100) and methods are provided herein. Systems (100) are expandable and include a plurality of vibration control devices (110) and at least a first controller (102) digitally linked with a second controller (104) via an interface (108). The first and the second controllers exchange information for generation of a force control command (FCC) either the first or second controller. The FCC is then executed at a first vibration control device (110) of the plurality of vibration control devices (FG) for providing active vibration control within a vehicle. A method of providing vibration control in a vehicle includes providing a plurality of active vibration control devices (100) and providing at least a first controller (102) digitally linked with a second controller (104). The method further includes generating a FCC using information exchanged between the first and the second controllers. The method further includes sending the FCC to a first vibration control device (110) of the plurality of devices (FG).

46 Claims, 4 Drawing Sheets

(58) Field of Classification Search
USPC .................................................. 701/3, 8, 10
See application file for complete search history.

(56) References Cited

U.S. PATENT DOCUMENTS

| | | | |
|---|---|---|---|
| 2007/0156289 A1* | 7/2007 | Altieri | G01M 1/22 700/280 |
| 2009/0306829 A1* | 12/2009 | Hildebrand | G01M 1/36 700/279 |
| 2010/0012768 A1 | 1/2010 | Jolly | |
| 2010/0034655 A1* | 2/2010 | Jolly | B64C 27/001 416/145 |
| 2012/0158217 A1 | 6/2012 | Jolly et al. | |

* cited by examiner

ACTIVE VIBRATION CONTROL SYSTEMS AND METHODS FOR VEHICLES

CROSS REFERENCE TO RELATED APPLICATION

This application relates to and claims priority to U.S. Provisional Patent Application Ser. No. 61/725,043, filed Nov. 12, 2012, the disclosure of which is fully incorporated herein by reference, in the entirety.

TECHNICAL FIELD

The present subject matter relates generally to active vibration control systems and methods for use within a vehicle. More particularly the present subject matter relates to expandable active vibration control systems and methods within an aircraft.

BACKGROUND

Various types of vehicles experience vibrations during operation. Such vibrations are particularly troublesome in rotary winged aircraft (e.g., helicopters, single rotor or tandem rotor) as vibrations transmitted by large rotors can contribute to fatigue and wear on equipment, materials, and occupants within the aircraft.

Currently, vibration control systems and methods are limited in the number of actuators and/or applications used to implement vibration control, as the number of control lines or control channels within a given system are limited. There is not yet an efficient system and/or method of expanding active vibration control without incurring the cost and expense associated with qualifying additional controllers and/or redesigning existing controllers.

Accordingly, there is a need for improved active vibration control systems and methods for various types of vehicles, including aircraft.

SUMMARY

In accordance with the disclosure provided herein, a vibration control system is provided. The system includes a plurality of vibration control devices and at least a first controller digitally linked with a second controller via an interface. The interface includes a communication and/or power interface. The first and the second controllers are configured to exchange information for generation of a force control command (FCC) either the first or the second controller. The FCC is then executed at a first vibration control device of the plurality of vibration control devices for providing active vibration control within a vehicle.

In further aspects, either the first or the second controller is a master controller configured to generate the FCC for execution at the first active vibration control device, but the FCC generated at the first controller is indirectly received at the first vibration control device via communication from a slave controller which did not generate the FCC but which receives the FCC therefrom.

In further aspects, a method of providing vibration control in a vehicle is provided. The method includes providing a plurality of active vibration control devices and providing at least a first controller digitally linked with a second controller. The method further includes generating a FCC using information exchanged between the first and the second controllers. The method further includes sending the FCC to a first vibration control device of the plurality of vibration control devices.

In further aspects, expandable active vibration control systems and methods are provided. Expandable systems include multiple (e.g., more than two controllers), where each controller is digitally interface or linked with at least one other controller. Information including rotor speed(s), Force Control Command FCC's, status of line replaceable units (LRUs), error codes, diagnostic information, software updates, and/or de-modulated accelerometer values are exchanged or communicated between the digitally linked controllers.

These and other objects of the present disclosure as can become apparent from the disclosure herein are achieved, at least in whole or in part, by the subject matter disclosed herein.

DETAILED DESCRIPTION

Figure 1:
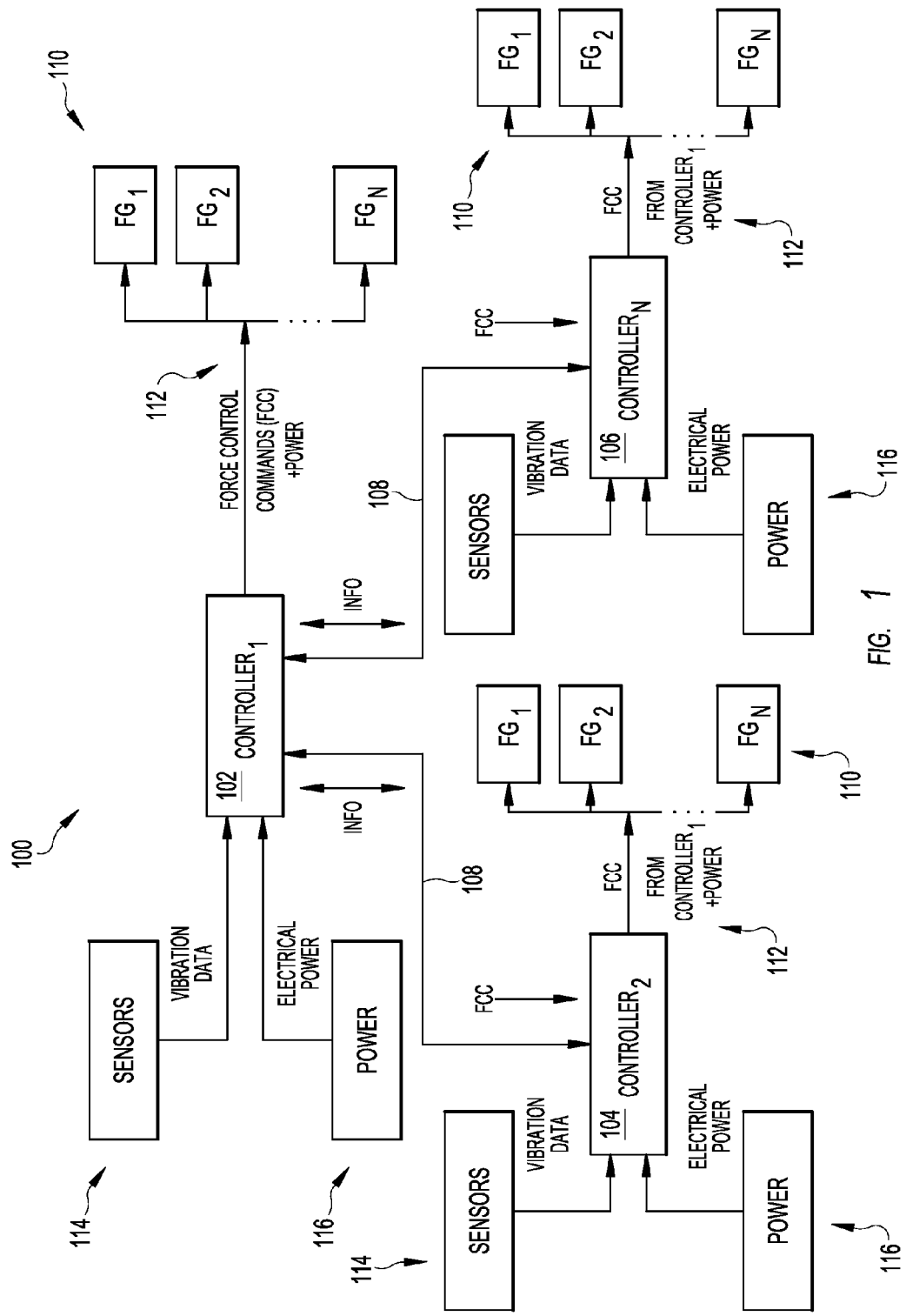
FIGS. 1 and 2 are block diagrams illustrating vibration control systems according to the subject matter described herein.

The subject matter described herein is directed to noise or vibration control systems and methods for use and installation within vehicles and aircraft, including rotary winged aircraft. In some aspects, noise or vibration control systems and methods described herein are "expandable" or capable of the rapid and efficient addition of controller channels available to support sensors, applications, and/or vibration control devices (e.g., linear actuators or rotary force generators) without requiring costly redesigns and/or qualifications.

In some aspects, vibration control devices, systems, and methods described herein provide active, as opposed to passive vibration control. This allows for improved compensation for the complex dynamics of vehicular (e.g., aircraft or helicopter) structures, optimum vibration cancellation for all flight conditions (e.g., steady state, transient), and the superior ability to track changes in rotor speed.

In some aspects, vibration control systems and methods include an ability to connect multiple (e.g., 2 or more) centralized controllers to expand the number of control sensors and/or actuators needed without modifying and/or qualifying additional hardware. In some aspects, vibration control systems and methods include controllers are connected via a 2-way communication link or communication interface.

In some aspects, a main or "master" controller is configured to exchange information with one or more other "slave" controllers. The master controller can exert unilateral control over the one or more other slave controllers and/or force generators (FGs). In some aspects, the information exchanged between the master and slave controllers is used for monitoring vibration within a vehicle, monitoring device status within a vehicle, and/or generating or calculating of force control commands (FCCs). FCCs transmitted to vibration control devices including FGs induce production or generation of vibration cancelling forces.

In some aspects, the master controller is configured to receive information both directly and indirectly from a plurality of sensors (e.g., accelerometers) and vibration control devices (e.g., FGs) via slave controllers, calculate appropriate FCCs for each vibration control device, and communicate those FCCs to the vibration control device via an intervening slave controller. FGs include linear actuators, balancers, or circular force generators (CFGs).

In some aspects, vibration levels within an aircraft are measured or detected by sensors (e.g., accelerometers) and forwarded to the master controller via at least one other slave controller. The master controller interprets the signals and generates FCCs for multiple vibration control devices located throughout the vehicle or aircraft. The vibration control devices create an "anti-vibration" effect that minimizes or eliminates the progression of vibration from a propeller, main rotor, or tandem rotors.

In some aspects, vibration control devices include force generators (FGs) such as linear actuators, balancers, or CFGs. FGs are configured to receive FCCs as input from a controller, whereby a processor within each FG executes software for generating vibration cancelling forces. In some aspects, the FCCs are executed via a processor of each FG and control an amount of vibration produced per device via controlling a rotation, speed, and/or position of imbalance masses and corresponding rotors within each FG.

In some aspects, systems and methods described herein are configured to monitor vibrations via sensors provided at a plurality of different locations, and actively test for structural response changes over time, such as when the aircraft is initially powered. If the structural response changes significantly over time, this may be an indication of a structural fault (e.g., a structural fatigue issue). This type of information is provided to controllers, and may be used in making sure that the rotary winged aircraft continues to fly safely, and may provide useful information to determine when structural modifications are necessary.

As used herein, the term "controller" refers to software in combination with hardware and/or firmware for implementing features described herein. In some aspects, a controller may include at least one memory and at least one processor configured to execute one or more steps stored in the at least one memory.

FIGS. 1 to 4 illustrate various views and/or features associated with active vibration control systems and methods providing expandable control over one or more devices within a vehicle, namely, within a rotary wing aircraft. In some aspects, vibration control devices and related methods described herein are expandable and operable for use in vehicles including single rotor aircraft (e.g., helicopters), tandem rotor aircraft (e.g., FIG. 3).

FIG. 1 is a block diagram illustrating one embodiment of a vibration control system, generally designated 100. System 100 includes at least one centralized controller 102 and any number (e.g., 1, 2 . . . N, where N is a whole number integer) of additional controllers, such as at least a second controller 104 and optionally a third controller 106. A system 100 including any number (e.g., where N>2) of equivalent and/or centralized controllers is envisioned within the subject matter herein.

Vibration control system 100 is expandable, meaning that the number of vibration control devices, actuators, hardware, software, sensors, applications, etc., supported by first centralized controller 102 is rapidly and efficiently expandable without requiring redesign of first centralized controller 102. In some aspects, vibration control implemented via system 100 is expanded via sharing or exchanging of information between first at least first centralized controller 102 and each of the additional second and/or third controllers 104 and 106, respectively.

In some aspects, first controller 102 is digitally linked to each of the other controllers, such as second controller 104 and optional third controller 106, via one or more data links, wired or wireless network links, or communication and/or power interfaces, generally referred to as interfaces 108. In some aspects, first controller 102 is linked to second controller 104 via at least one interface 108, and first controller 102 is also linked to another controller (e.g., third controller 106) via a different interface 108. Each interface 108 is operable for providing the bi-directional exchange of information between first controller 102 and each of the other controllers of system 100.

In some aspects, each interface 108 includes a wired or wireless network interface or any other transmission line or link for facilitating communication via a digital communications protocol. In some aspects, interface 108 is configured to transmit data in both directions via a signaling protocol. In some aspects, interface 108 communicates via a digital communication protocol including, for example only and without limitation, the Ethernet, RS-232, wireless protocol, controller area network (CAN), RS-422, ARINC-429, RS422, MIL-STD-1553, and/or any other suitable communication protocol. Each interface 108 is operable to bi-directionally share and/or exchange information regarding vibration control and equipment or system status between first controller 102 and each of the other remaining controllers.

Still referring to FIG. 1 and in some aspects, system 100 utilizes a communication model for implementing vibration control known in the art as a "master/slave" communication model. In this control scheme, one device has universal control over one or more other devices in the system. For example, first controller 102 includes a "master" device or master controller configured to exert unidirectional control over aspects of each additional "slave" controllers (e.g., second controller 104, optional third controller 106) and/or vibration control devices (e.g., FGs 110) within system 100. In some aspects, first controller 102 communicates information including force control commands (denoted "FCC") to each of the "slave" controllers via one or more interfaces 108. FCCs are generated at first controller 102 using information exchanged between first controller 102 and each additional controller within system 100.

Each slave controller (e.g., 104, 106) communicates FCCs received from first controller 102 (e.g., denoted "FCC FROM CONTROLLER$_1$") directly to one or more respective vibration control devices including one or more force generators (FGs) 110. Each controller (e.g., 102, 104, and 106) communicates FCCs generated at first controller 102 to one or more respective FGs 110 via communication and/or power interfaces 112. Thus, first controller 102 exerts indirect control over each FG 110 via load sharing across intervening controllers. The FCCs are received and executed at one or more FGs 110. FGs 110 are vibration control devices such as linear actuators, balancers, or circular force generators (CFGs).

In some aspects, FGs 110 are adapted to dampen, mitigate, or otherwise control vibration occurring within a vehicle via rotation of imbalance masses contained therein. In some aspects, FCCs specify or control aspects associated with the movement of the imbalance masses, thereby providing commands for cancelling and controlling harmful vibrations occurring within a vehicle.

FGs 110 further include a processor configured to receive FCCs as input from a respective controller, and execute software for generating vibration cancelling force(s) via actuation or rotation of imbalance masses. FCCs executed via a processor disposed at FGs 110 control an amount of vibration canceling force produced at each FG 110, and specify, inter alia, rotation, speed, and/or position of imbalance masses and corresponding rotors. Any number of FGs 110 can be provided in system 100. In some aspects, system 100 can include at least two controllers each supporting two or more FGs 110, four or more FGs 110, or six FGs 110.

In addition to FCCs, other types of information (e.g., denoted "INFO") are also exchanged between first controller 102 and each additional controller within system 100 via the plurality of interfaces 108. For example, information regarding rotor speed(s), status of line replaceable units ((LRU), e.g., hardware or equipment that is installed/replaced), indications of whether each LRU is working properly or failed, error codes, diagnostic information, software updates, and/or de-modulated accelerometer values (i.e., the real and imaginary parts of the acceleration at N/rev control frequency), are exchanged or communicated between first controller 102 and each additional controller as indicated by the double sided arrows along each interface 108.

In some aspects, information exchanged between first controller 102 and each additional controller includes several parameters used to generate FCCs at first controller 102. For example, the master controller (e.g., first controller 102) receives accelerometer (e.g., sensor) information from all slave controllers (e.g., 104, 106) to compute FCCs for each respective slave controller. In some aspects, first controller 102 computes FCCs using a least means square (LMS) adaptive control algorithm.

A plurality of sensors 114 are positioned about portions of the vehicle or aircraft for providing input regarding vibration to at least one centralized controller (e.g., 102, 104, and 106). In some aspects, sensors 114 include accelerometers that electrically communicate with a respective controller (e.g., 102, 104, and 106) via a communications interface or link. Sensors 114 provide vibration data used by first controller 102 in computing FCCs. For example, second controller 104 and/or any other slave controllers within system 100 transmit vibration information detected and communicated via sensors 114 to first controller 102. First controller then uses the vibration information detected and communicated via sensors 114 in generation and/or calculation of FCCs.

In some aspects, each controller (e.g., 102, 104, and 106) and each FG 110 within system 100 includes a power interface in addition to communication input/output interfaces. Power, from one or more vehicle power sources 116 is transmitted to each FG 110 via respective controllers. In some aspects, power source 116 include an aircraft engine whereby power is transferred to each controller (e.g., 102, 104, and 106) within system 100, which in turn transfer power to respective FGs 110.

In some aspects, the "master/slave" control scheme allows expandable vibration control to be executed rapidly and efficiently via load sharing across channels of a plurality of controllers within system 100. Thus, additional vibration control devices (e.g., FGs 110) and/or sensor equipment (e.g., sensors 114) can be brought online quickly and efficiently, without having to reconfigure first centralized controller 102. In this control scheme, any controller (e.g., 102, 104, or 106) can be the master controller configured to send FCCs to each of the other controllers.

Figure 2:
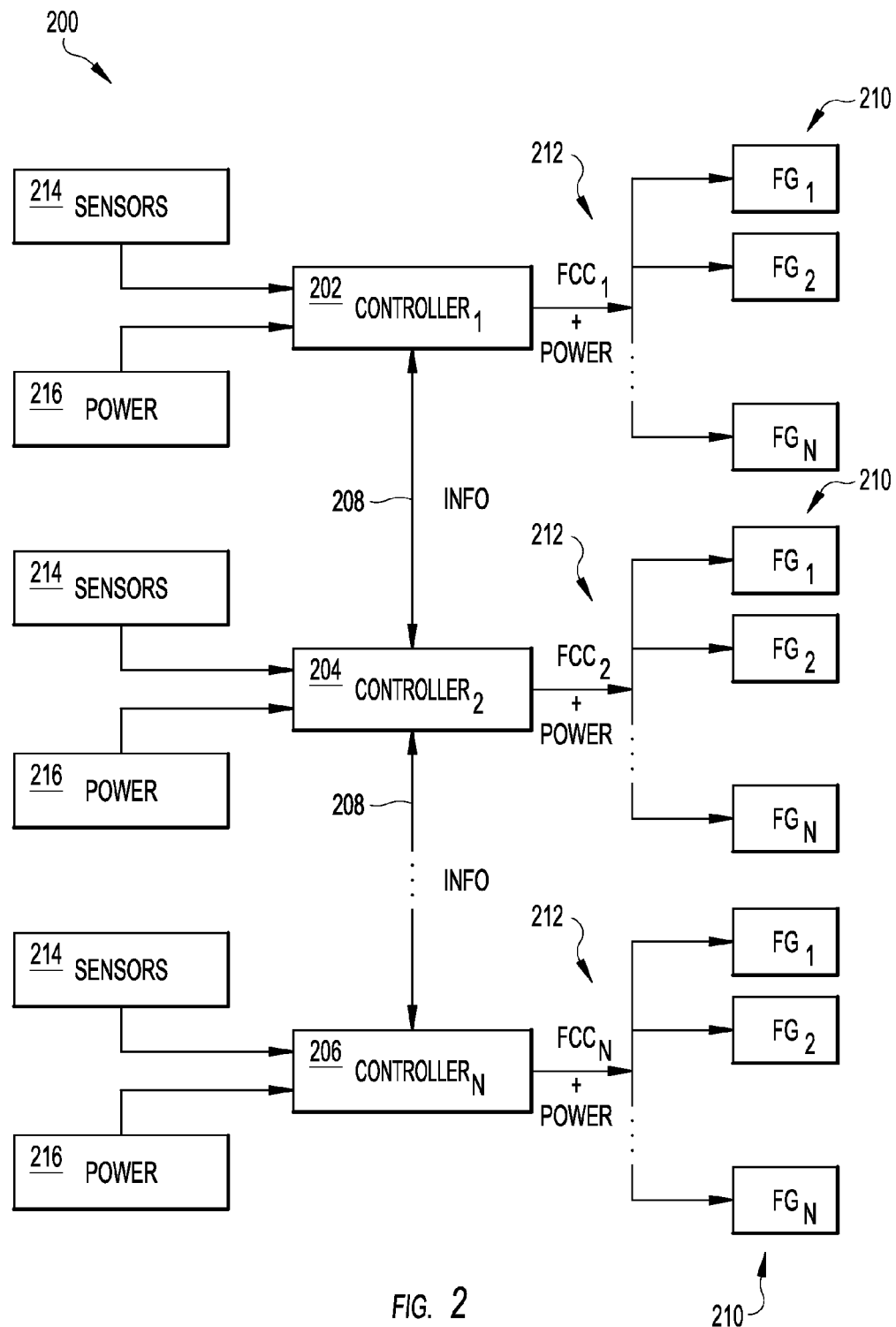

FIG. 2 is a block diagram illustrating another embodiment of a vibration control system, generally designated 200. System 200 includes a plurality of centralized controllers, including at least a first controller 202 and a second controller 204. An optional third controller 206 is shown, however, any number (e.g., 1, 2 . . . N, where N is a whole number integer) of additional controllers may be provided. The plurality of centralized controllers (e.g., 202, 204, and 206) share information with each other related to vibration control and status of devices or systems connected thereto. Each controller (e.g., 202, 204, 206) individually computes FCCs (e.g., denoted $FCC_1$, $FCC_2$, to $FCC_N$ where N>1) using the shared information. System 200 does not exhibit the master/slave control scheme, but rather each controller exerts individual control over FGs 210 using the shared information (denoted "INFO").

Vibration control system 200 is expandable, meaning that the number of vibration control devices, actuators, hardware, software, sensors, applications, etc., provided within a vehicle or aircraft is rapidly and efficiently expandable without requiring redesign hardware. In some aspects, vibration control implemented via system 200 is expanded via sharing or exchanging of information each controller within system 200.

Controllers (e.g., 202, 204, and 206, etc.) within system 200 are digitally connected via an interface or interfaces 208. Controllers (e.g., 202, 204, and 206) within system 200 share or exchange information including rotor speed (e.g., one controller sending to other controllers), status of LRUs, error codes, diagnostic information, software updates, demodulated accelerometer values (e.g., real and imaginary part of acceleration at N/rev control frequency, and/or FCCs.

Using a control scheme illustrated in FIG. 2 allows information regarding aircraft parameters (e.g., rotor speed(s)) to be shared among controllers and collectively used to generate multiple FCCs individually at each controller. Resources may be rapidly expanded in system 200 as additional controllers are brought online and interface with each other controller. In some aspects, each controller includes four to six output channels for supporting two to six actuators/FGs and eight to sixteen accelerometer channels for supporting five to sixteen sensors 214. System 200 expands as additional controllers are brought online to support additional sensors/actuators, as necessary, and as the additional controllers interface with existing controllers. As data or information including rotor speed, error codes, component/equipment status, diagnostic information, software updates, and/or de-modulated accelerometer values are collectively shared amount controllers of system 200, more efficient active vibration control is implemented.

Still referring to FIG. 2, FCCs are transmitted individually from each controller in system 200 (e.g., first controller 202 generates a first FCC and second controller 204 generates a second FCC, and so on, etc.) to respective vibration control devices including FGs 210 (e.g., also denoted $FG_1$ to $FG_N$ where N is an integer >1). Electrical power is provided to controllers (e.g., 202, 204, and 206) and/or FGs 210 via transmitting power from a power source 216 of the vehicle or aircraft, such as one or more engines. In some aspects, each controller (e.g., 202, 204, 206) is adapted to provide electrical power in addition to FCCs to each FG 210 via communication and/or power interfaces 212. Electrical power is received and communicated to motors and/or rotors of each FG 210. Any number of FGs 210 can be provided in system 200. In some aspects, system 200 includes at least two controllers each supporting two or more FGs 210, four or more FGs 210, or six or more FGs 210.

The force or forces generated by one or more FGs 210 upon receiving FCCs from controllers actively cancel the complex vibration occurring within the vehicle due to the vibrating rotors, blades, etc., of the vehicle.

Sensors 214 are provided at various locations about the vehicle or aircraft. For example, sensors can be positioned at a vehicle frame, (e.g., aircraft frame), proximate, proximate rotor(s), blade(s), etc. for measuring and communicating vibration data to respective controllers (e.g., 202, 204, and 206).

Figure 3:
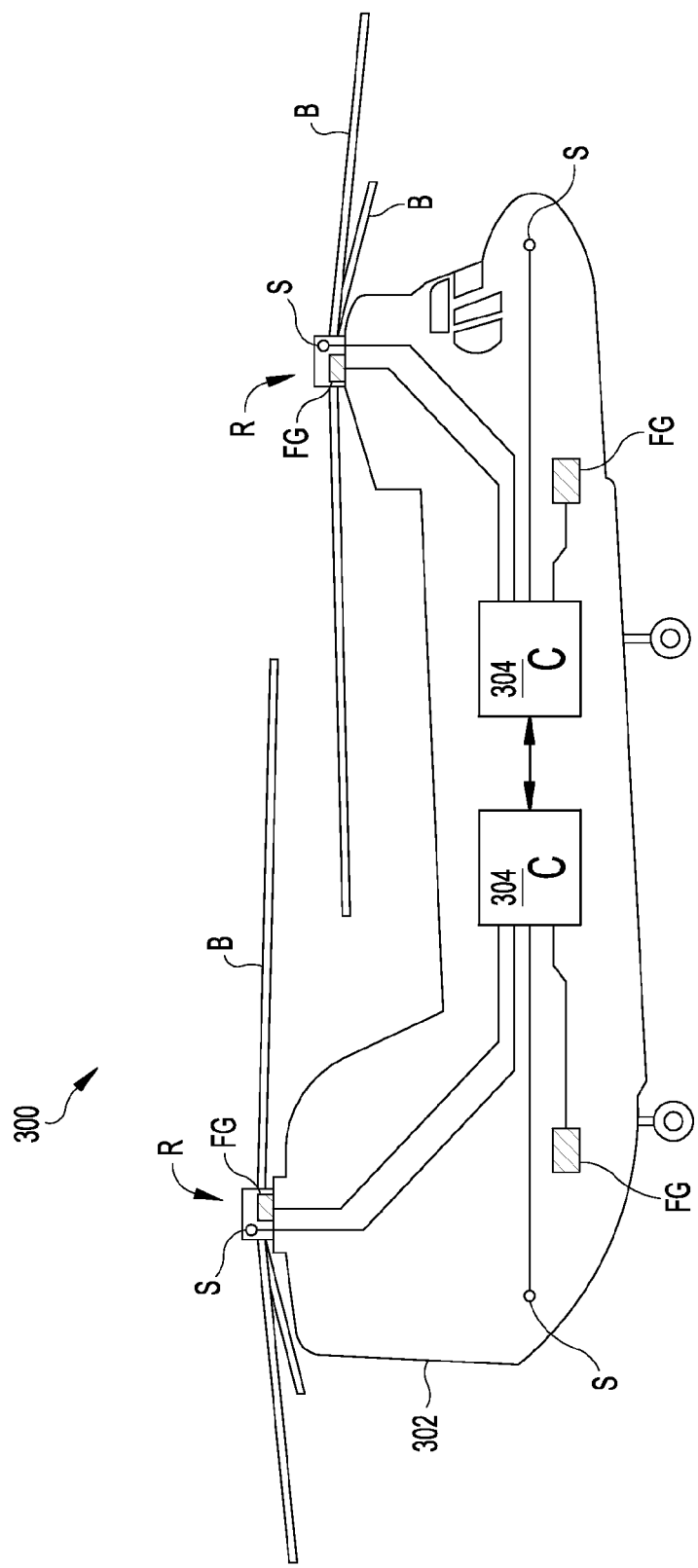
FIG. 3 is a schematic diagram illustrating a vehicle including vibration control systems according to the subject matter described herein.

FIG. 3 illustrates a schematic diagram of a tandem rotor aircraft or tandem rotor helicopter, generally designated 300 is shown. For illustration purposes only, a rotary winged aircraft is illustrated; however, systems and methods described herein are also applicable to other types of aircraft and/or operable for actively canceling vibrations in other types of aircraft.

Referring now to FIG. 3, aircraft 300 includes an aircraft frame 302, at least one rotating rotor R, and in some aspects multiple rotating rotors R. As blades B rotate about rotors R, complex vibrations become induced within aircraft 300. An active vibration control system including at least first and second centralized controllers 304 as described in FIGS. 1 and 2 is provided within aircraft 300. Controllers 304 are digitally linked and share or exchange information via a digital communication interface 306. The control scheme within aircraft 300 is expandable, as the number of controlled devices, applications, etc., is increased.

The control system further includes one or more sensors S and one or more vibration control devices FGs for canceling or mitigating such complex vibrations. Sensors S are provided over portions of the aircraft frame, under seats, and/or proximate rotors R. In some aspects, controllers 304 monitor vibrations via sensors S and send FCCs to vibration control devices (e.g., force generators) FGs for generating vibration canceling forces. FCCs are calculated at a main controller and shared with other controllers such that the main controller indirectly controls each FG as described in FIG. 1. Alternatively, FCCs are individually calculated at each controller 304 using shared information as described in association with FIG. 2.

Figure 4:
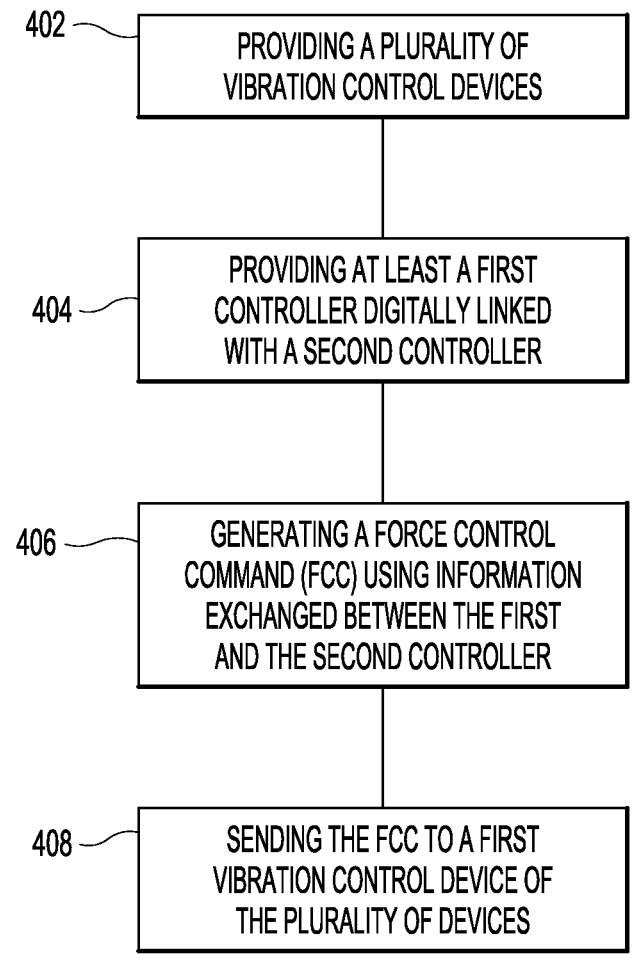
FIG. 4 is a block diagram illustrating a method of vibration control according to the subject matter described herein.

FIG. 4 is a block diagram illustrating a method of vibration control according to aspects of the subject matter described herein. At block 402, a plurality of vibration control devices is provided. Vibration control devices include FGs such as linear actuators, and/or CFGs.

At block 404, at least a first and a second controller are provided. The controllers are digitally linked and configured to share or exchange information via a communication interface. In some aspects, the communication interface is configured to transmit data in both directions via a signaling protocol. Data can be exchange via an interface supporting protocol including the Ethernet, RS-232, CAN (e.g. controller area network bus), RS-422, ARINC-429, RS422, or MIL-STD-1553. Information regarding rotor speed(s), status of LRUs, error codes, diagnostic information, software updates, FCCs, and/or de-modulated accelerometer values are exchanged or communicated between the digitally linked controllers via interface.

At block 406, a FCC is generated using information exchanged between the first and the second controller. FCCs are calculated at a main or controller and shared with other controllers such that the main controller indirectly controls each FG as described in FIG. 1 (e.g., known as a master/slave control scheme). Alternatively, FCCs are individually calculated at each controller using the exchanged or shared information as described in FIG. 2.

At block 408, the FCC is sent to a first vibration control device of the plurality of control devices. The FCC is executed by a processor provided at and/or within the vibration control device.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims

What is claimed is:

1. A vibration control system comprising:
a plurality of vibration control devices;
at least a first controller digitally linked with a second controller via a two-way electronic communication interface; and
wherein the first and the second controllers are configured to exchange information for generation of a force control command (FCC) at either one of the first or the second controllers, and wherein the FCC is executed at a first vibration control device of the plurality of vibration control devices for providing active vibration control, the second controller being slaved to the first controller.

2. The system of claim 1, wherein the first controller is configured to generate and send a plurality of FCCs to a plurality of other controllers.

3. The system of claim 1, wherein the first controller is configured to generate a first FCC and a wherein the second controller is configured to generate a second FCC.

4. The system of claim 1, wherein the interface includes an Ethernet communication protocol, an RS232 communication protocol, a fiber optic cable protocol, a controller area network (CAN) bus communication protocol, an ARINC-429 communication protocol, an RS422 communication protocol, a MIL-STD-1553 communication protocol, or a wireless communication protocol.

5. The system of claim 1, further comprising at least three controllers linked via a two-way electronic communication, wherein two of the controllers are slaved to the first controller.

6. The system of claim 1, wherein the first and second controllers are configured to exchange information including a rotor speed.

7. The system of claim 1, wherein the first and second controllers are configured to exchange information including at least one error code.

8. The system of claim 1, wherein the first and second controllers are configured to exchange information including diagnostic information.

9. The system of claim 1, wherein the first and second controllers are configured to exchange information including a software update.

10. The system of claim 1, wherein the first and second controllers are configured to exchange information including a de-modulated accelerometer value.

11. The system of claim 1, wherein the plurality of active vibration control devices comprises a plurality of circular force generators (CFGs).

12. The system of claim 1, wherein the plurality of active vibration control devices comprises a plurality of linear actuators.

13. The method of claim 1, wherein the plurality of active vibration control devices comprises a plurality of balancers.

14. A vibration control system comprising:
a plurality of active vibration control devices;
at least a first controller digitally linked with a second controller via a two-way electronic communication therebetween; and
wherein the first controller is configured to generate a force control command (FCC) for execution at a first active vibration control device of the plurality of active vibration control devices, and wherein the FCC is communicated to the first active vibration control device via the second controller, the second controller being slaved to the first controller.

15. The system of claim 13, wherein the first controller is configured to generate the FCC using information exchanged by the first controller and the second controller.

16. The system of claim 13, wherein the first and second controllers are configured to exchange information including a rotor speed.

17. The system of claim 13, wherein the first and second controllers are configured to exchange information including at least one error code.

18. The system of claim 13, wherein the first and second controllers are configured to exchange information including diagnostic information.

19. The system of claim 13, wherein the first and second controllers are configured to exchange information including a software update.

20. The system of claim 13, wherein the first and second controllers are configured to exchange information including a de-modulated accelerometer value.

21. The system of claim 13, further comprising a plurality of sensors connected to the first and second controllers.

22. The system of claim 13, wherein the plurality of vibration control devices comprises a plurality of circular force generators (CFGs), linear actuators, or balancers.

23. A method of providing vibration control in a vehicle, the method comprising:
providing a plurality of active vibration control devices;
providing at least a first controller digitally linked with a second controller, the first controller and second controller having a two-way electronic communication therebetween, wherein the second controller is slaved to the first controller;
generating a force control command (FCC) using information exchanged between the first and the second controllers; and
sending the FCC to a first vibration control device of the plurality of vibration control devices.

24. The method of claim 23, wherein providing at least a first controller digitally linked with a second controller includes using an Ethernet communication protocol.

25. The method of claim 23, wherein providing at least a first controller digitally linked with a second controller includes using a RS232 communication protocol.

26. The method of claim 23, wherein providing at least a first controller digitally linked with a second controller includes using a fiber optic cable communication protocol.

27. The method of claim 23, wherein providing at least a first controller digitally linked with a second controller includes using a controller area network (CAN) communication protocol.

28. The method of claim 23, wherein providing at least a first controller digitally linked with a second controller includes using an ARINC-429 communication protocol.

29. The method of claim 23, wherein providing at least a first controller digitally linked with a second controller includes using a RS422 communication protocol.

30. The method of claim 23, wherein providing at least a first controller digitally linked with a second controller includes using a MIL-STD-1553 communication protocol.

31. The method of claim 23, wherein providing at least a first controller digitally linked with a second controller includes using a wireless communication protocol.

32. The method of claim 23, wherein providing a plurality of active vibration control devices comprises providing a plurality of circular force generators (CFGs).

33. The method of claim 23, wherein providing a plurality of active vibration control devices comprises providing a plurality of linear actuators.

34. The method of claim 23, wherein providing a plurality of active vibration control devices comprises providing a plurality of balancers.

35. The method of claim 23, wherein the information exchanged by the first controller and the second controller includes a rotor speed.

36. The method of claim 23, wherein the information exchanged by the first controller and the second controller includes at least one error code.

37. The method of claim 23, wherein the information exchanged by the first controller and the second controller includes diagnostic information.

38. The method of claim 23, wherein the information exchanged by the first controller and the second controller includes a software update.

39. The method of claim 23, wherein the information exchanged by the first controller and the second controller includes a de-modulated accelerometer value.

40. A vibration control system comprising:
a plurality of vibration control devices;
a plurality of sensors;
a master controller digitally linked with at least one slave controller via a two-way electronic communication interface, the slave controller slaved to the master controller, wherein the slave controller and master controller are configured to share information using the two-way communication;
wherein the master controller is configured to directly receive information from the plurality of vibration control devices and the plurality of sensors, and wherein the master controller is configured to receive indirect information from the plurality of vibration control devices and the plurality of sensors from the at least one slave controller; and
wherein the master controller is configured to generate at least one force control command (FCC) for each vibration control device in direct communication therewith, and the master controller is configured to communicate the at least one FCC to at least one slave controller and at least one slave controller communicates the at least one FCC to each vibration control device attached thereto, wherein the FCC provides active vibration control.

41. The system of claim 40, wherein the interface includes an Ethernet communication protocol, an RS232 communication protocol, a fiber optic cable protocol, a controller area network (CAN) bus communication protocol, an ARINC-429 communication protocol, an RS422 communication protocol, a MIL-STD-1553 communication protocol, or a wireless communication protocol.

42. The system of claim 40, further comprising at least one master controller and at least two slave controllers linked via a two-way electronic communication.

43. The system of claim 40, wherein the master controller and at least one slave controller are configured to exchange information including a rotor speed, at least one error code, a diagnostic information, a software update, or a de-modulated accelerometer value.

44. The system of claim 40, wherein the plurality of active vibration control devices comprises a plurality of circular force generators (CFGs).

45. The system of claim 40, wherein the plurality of active vibration control devices comprises a plurality of linear actuators.

46. The method of claim 40, wherein the plurality of active vibration control devices comprises a plurality of balancers.

* * * * *